US008639840B2

(12) United States Patent
Chang et al.

(10) Patent No.: US 8,639,840 B2
(45) Date of Patent: Jan. 28, 2014

(54) PROCESSING UNIT, CHIP, COMPUTING DEVICE AND METHOD FOR ACCELERATING DATA TRANSMISSION

(75) Inventors: Xiao Tao Chang, Beijing (CN); Rui Hou, Beijing (CN); Wei Liu, Beijing (CN); Kun Wang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 13/074,121

(22) Filed: Mar. 29, 2011

(65) Prior Publication Data

US 2011/0246667 A1 Oct. 6, 2011

(30) Foreign Application Priority Data

Mar. 30, 2010 (CN) .......................... 2010 1 0136974

(51) Int. Cl.
*G06F 15/16* (2006.01)
*G06F 13/00* (2006.01)
*G06F 13/42* (2006.01)

(52) U.S. Cl.
USPC .............. 709/237; 710/33; 710/100; 710/105

(58) Field of Classification Search
USPC ..................... 709/237; 710/35, 33, 100, 105
See application file for complete search history.

(56) References Cited

U.S. PATENT DOCUMENTS

| 5,175,825 | A | * | 12/1992 | Starr ............................. 709/213 |
| 5,469,577 | A | * | 11/1995 | Eng et al. ........................ 710/35 |
| 5,584,033 | A | * | 12/1996 | Barrett et al. ................. 710/105 |
| 5,673,398 | A | * | 9/1997 | Takeda .......................... 710/105 |
| 5,727,233 | A | * | 3/1998 | Lynch et al. ..................... 710/35 |
| 5,802,546 | A | * | 9/1998 | Chisholm et al. ............. 711/100 |
| 6,058,438 | A | | 5/2000 | Diehl et al. |
| 6,721,832 | B2 | * | 4/2004 | Ishibashi ......................... 710/35 |
| 6,779,053 | B2 | * | 8/2004 | Ippolito et al. .................. 710/33 |
| 7,143,246 | B2 | | 11/2006 | Johns |
| 7,330,925 | B2 | | 2/2008 | Ogilvie et al. |
| 7,355,601 | B2 | | 4/2008 | Andrews et al. |
| 7,526,593 | B2 | * | 4/2009 | Mandal et al. .................. 710/35 |
| 7,555,576 | B2 | * | 6/2009 | Leijten ............................ 710/35 |
| 2003/0093648 | A1 | | 5/2003 | Moyer |
| 2006/0112235 | A1 | | 5/2006 | Cabot et al. |
| 2007/0204076 | A1 | | 8/2007 | Arulambalam et al. |
| 2007/0226424 | A1 | | 9/2007 | Clark et al. |
| 2008/0201499 | A1 | * | 8/2008 | Gruijl ............................ 710/35 |

FOREIGN PATENT DOCUMENTS

| CN | 101552733 A | 10/2009 |
| WO | WO 2006/031462 A1 | 3/2006 |

* cited by examiner

*Primary Examiner* — Christopher Revak
*Assistant Examiner* — Vadim Savenkov
(74) *Attorney, Agent, or Firm* — Scully, Scott, Murphy & Presser, P.C.; Jennifer R. Davis, Esq.

(57) ABSTRACT

A processing unit coupled to a bus for accelerating data transmission and a method for accelerating data transmission. The present invention provides a streaming data transmission mode in which a plurality of data blocks are transmitted via one handshake. The present invention employs handshake save policy, when a processing unit sends a request comprising a plurality of data blocks on a bus, a cache or memory will perform address matching to judge whether there is any hit data block. If there is any hit data block, the cache or memory only needs to reply once and then start to continuously transmit the hit data blocks it possesses. Thus, a separate handshake for each data block is no longer needed.

25 Claims, 8 Drawing Sheets

| Read/write identification | Handshake save command | Request ID | Processing unit ID | Start address | End address |
|---|---|---|---|---|---|
| 0 | 1 | 0001 | 0001 | 32 | 543 |

FIG. 6A

| Read/write identification | Handshake save policy response identification | Request ID | Storage unit ID | Hit-or-not identification |
|---|---|---|---|---|
| 0 | 1 | 0001 | 1000 | 1 |

FIG. 6B

| Request ID | Completion mark |
|---|---|
| 0001 | 1 |

FIG. 6C

| Read/write identification | Handshake save command | Request ID | Processing unit ID | Start address | End address |
|---|---|---|---|---|---|
| 0 | 1 | 0010 | 0001 | 15648 | 16415 |

FIG. 7A

| Read/write identification | Handshake save policy response identification | Request ID | Storage unit ID | Hit-or-not identification |
|---|---|---|---|---|
| 0 | 1 | 0010 | 1000 | 1 |

FIG. 7B

| Request ID | Completion mark |
|---|---|
| 0010 | 1 |

FIG. 7C

| Read/write identification | Handshake save command | Request ID | Processing unit ID | Start address | End address |
|---|---|---|---|---|---|
| 0 | 1 | 0100 | 0001 | 16384 | 16415 |

FIG. 7D

| Read/write identification | Handshake save policy response identification | Request ID | Storage unit ID | Hit-or-not identification |
|---|---|---|---|---|
| 0 | 1 | 0100 | 0100 | 1 |

FIG. 7E

| Request ID | Completion mark |
|---|---|
| 0100 | 1 |

FIG. 7F

PROCESSING UNIT, CHIP, COMPUTING DEVICE AND METHOD FOR ACCELERATING DATA TRANSMISSION

CROSS-REFERENCE TO RELATED APPLICATIONS

This application claims priority under 35 U.S.C. §119 to Chinese Patent Application No. 201010136974.4 filed Mar. 30, 2010, the entire contents of which are incorporated by reference herein.

TECHNICAL FIELD OF THE INVENTION

The present invention generally relates to data transmission on bus, in particular, to a processing unit, chip, computing device and method for accelerating transmission of streaming data on bus.

BACKGROUND OF THE INVENTION

Currently, a processing unit within a chip can be composed of processor cores or be composed of hardware accelerators (accelerator for short). Improving processing capability of processor core by means of an accelerator is one of the trends in manufacturing high performance CPU. An accelerator can assist a processor core in processing some specialized tasks such as encryption, compression, etc. The adoption of an accelerator relieves the burden of a processor core which can mainly perform general purpose tasks that barely have any rule in structure. A chip with an accelerator generally has enhanced computing capability, because it not only possesses flexibility of general purpose processor, but also has a computing advantage of special purpose hardware.

Referring to FIG. 1A or FIG. 1B, a processing unit usually will broadcast a data request on a bus, and the requested data can be stored in a cache coupled to a processor core or merely be stored in memory. Normally, the requested data will be searched for in the cache first, and corresponding data will be read from relatively low-speed memory only if there is no desired data in the cache. Data provided in the memory will probably be simultaneously loaded in the cache so that subsequent read for same data will all be performed in the cache without having to access the memory again.

Referring to FIG. 2A, after the processing unit broadcasts a data request on the bus, both the cache and the memory will query its local storage and send a reply signal to the processing unit for telling whether it has any hit data block(s), and the processing unit will accordingly make preparation for receiving hit data block(s). The request for data and the reply thereto constitute a handshake. If there is a hit data block, one data block will be transmitted from the cache or memory to the processing unit after each handshake. The processing unit will then initiate a next round of handshakes after obtaining certain data block so as to request a next data block. In other words, the processing unit needs to initiate a handshake once at every request for data block, so sixteen handshakes have to be initiated for requesting sixteen data blocks.

SUMMARY OF THE INVENTION

Since an accelerator is commonly used for doing some specialized tasks, most of the data it requests for processing are streaming data. Streaming data is characterized by having a large volume of data, data blocks having a continuous address and having the requested data blocks located in a same cache. Furthermore, in some scenarios, data requested by a processor core can also constitute streaming data.

Since a handshake will be conducted multiple times, there are many defects in the existing process of an accelerator requesting data for processing. First, multiple handshakes can lead to an increase in power consumption of the chip. Each time a data request is sent, all the caches on the chip that are in a listening state need to perform an address matching process for determining whether there is cache hit. Therefore, repeatedly performing address matching will greatly increase power consumption of the whole chip. Second, multiple handshakes can result in unnecessary latency. Each time a data request is received, the cache needs to perform address matching, thereby consuming more time periods, leading to more handshakes and longer latency. The same problem will occur when a processor core requests streaming data in a non-local cache or memory.

In order to save power consumption of a system and reduce transmission latency, the present invention, by utilizing characteristics of streaming data, creatively proposes a transmission mode in which a plurality of data blocks are transmitted via one handshake. The present invention employs a handshake save policy. When a processing unit sends a request including a plurality of data blocks (usually in unit of cacheline) on a bus, a cache or memory will perform address matching to judge whether there is any hit data block. If there is any hit data block, the cache or memory only needs to reply once and then start to continuously transmit the hit data blocks it possesses. Thus, a separate handshake for each data block is no longer needed.

The invention provides a processing unit for accelerating data transmission, the processing unit being coupled to a bus, including: a transmission policy controller for controlling initiation of a handshake save policy according to predetermined applicable condition, the handshake save policy being used to allow data blocks of at least two adjacent address segments to be continuously transmitted on the bus; and a data access controller for sending data request on the bus, receiving reply to the data request from the bus, and receiving hit data block from the bus if there is any hit data block.

The invention also provides a chip for accelerating data transmission, including the above processing unit and a bus.

The invention also provides a computing device for accelerating data transmission, including: the above chip and a memory.

The invention also provides a method for accelerating data transmission, including: controlling initiation of a handshake save policy according to predetermined applicable condition, the handshake save policy being used to allow data blocks of at least two adjacent address segments to be continuously transmitted on a bus; sending data request on the bus; receiving reply to the data request from the bus; and receiving hit data block transmitted according to the handshake save policy from the bus if there is any hit data block.

When processing streaming data, the handshake save policy of the present invention can save power consumption of chip and reduce transmission latency, thereby improving work efficiency of overall processing unit.

BRIEF DESCRIPTION OF THE DRAWINGS

The drawings referred to in the description are only used to illustrate typical embodiments of the invention, and should not be considered as a limitation on the scope of the invention:

FIG. 6A illustrates a structure diagram of a data request signal according to an embodiment of the invention;

FIG. 6B illustrates a structure diagram of a reply signal according to an embodiment of the invention;

FIG. 6C illustrates a structure diagram of a transmission complete signal according to an embodiment of the invention;

FIG. 7A illustrates a structure diagram of a data request signal according to another embodiment of the invention;

FIG. 7B illustrates a structure diagram of a reply signal according to another embodiment of the invention;

FIG. 7C illustrates a structure diagram of a transmission complete signal according to another embodiment of the invention;

FIG. 7D illustrates a structure diagram of a data request signal according to yet another embodiment of the invention;

FIG. 7E illustrates a structure diagram of a reply signal according to yet another embodiment of the invention;

FIG. 7F illustrates a structure diagram of a transmission complete signal according to yet another embodiment of the invention;

DETAILED DESCRIPTION OF THE PREFERRED EMBODIMENTS

In the following discussion, a large amount of specific details are provided to facilitate to understand the invention thoroughly. However, for those skilled in the art, it is evident that it does not affect the understanding of the invention without these specific details. It will be recognized that, the usage of any of following specific terms is just for convenience of description, thus the invention should not be limited to any specific application that is identified and/or implied by such terms.

Figure 1A:
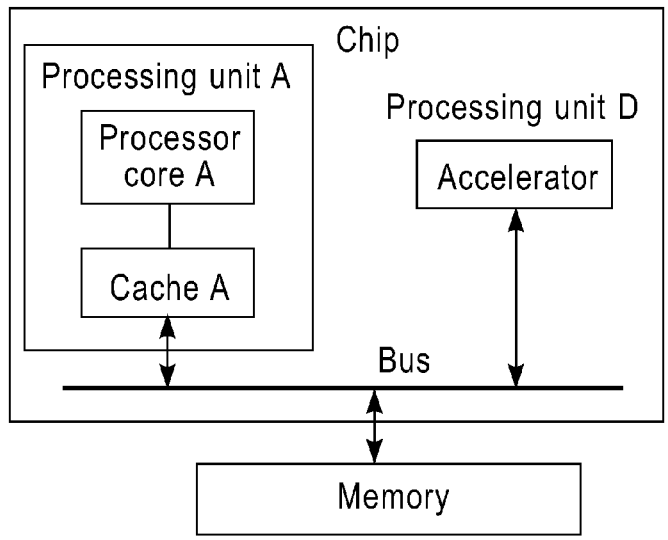
FIG. 1A illustrates a structure diagram of a chip employing an accelerator and a single processor core.

FIG. 1A illustrates a structure diagram of a chip employing an accelerator and single processor core. The chip in FIG. 1A includes a processing unit A, a processing unit D and a bus. Memory is normally located outside the chip and is configured as coupled to the bus. The processing unit A includes a processor core A and a cache A. Cache A can include only one first level cache, or can include multilevel caches (e.g. further including a second or third level cache), and the processing unit D is an accelerator.

In a first example, an accelerator broadcasts a data request on the bus, the data requested by the accelerator is in cache A, cache A will send a reply to the data request to the accelerator for telling it that there is data hit. Meanwhile, the memory will also send a reply to the accelerator for telling it that there is no data hit. For streaming data, when a handshake save policy is applicable, cache A only needs to transmit all the hit data blocks it possesses to the accelerator at one time without having to repeatedly perform handshake between the accelerator and cache A before transmitting every data block. The data block in a cache is stored in a unit of a cacheline (e.g. one cacheline is capable of storing 64 byte data as a data block).

Figure 2A:
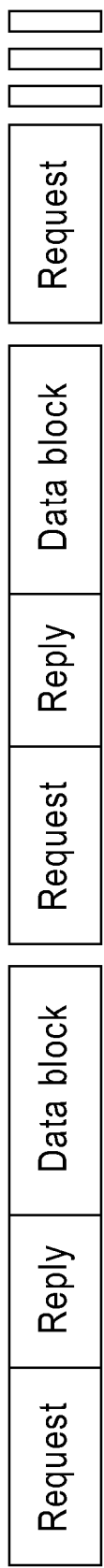
FIG. 2A illustrates a diagram of data transmission implemented by utilizing multiple handshakes according to the prior art.
Figure 2B:
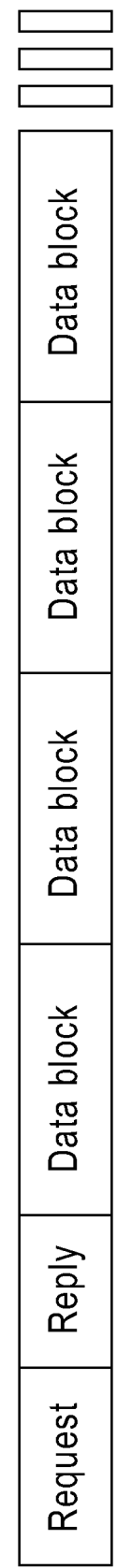
FIG. 2B illustrates a diagram of data transmission implemented by utilizing single handshake according to a handshake save policy.

FIG. 2B illustrates a diagram of data transmission implemented by utilizing a single handshake according to handshake save policy. It can be easily seen from FIG. 2B that, when transmitting data blocks of streaming data, power consumption of the chip is saved and transmission latency is reduced due to cutting down of repeated handshakes.

In a second example, the data requested by the accelerator is in memory. After the accelerator sends a data request on the bus, the memory sends a reply to the accelerator through the bus to indicate there is data hit, and when a handshake save policy is applicable, the memory continuously sends hit data blocks it possesses to the accelerator. The data in the memory is stored in a unit of a memory cell (e.g. one memory cell is capable of storing 16 byte data as a data block).

In a third example, the first half of the data requested by the accelerator is stored in cache A, while the second half of the data requested is stored in memory. After the accelerator sends a data request, cache A will send a reply that there is data hit, and then continuously transmit hit data blocks it possesses. After transmission is completed, the accelerator will again send a data request for the second half of data that has not been received. This time the memory will send a reply that there is data hit, and will continuously transmit the hit data it possesses, namely, the second half of data.

Since an accelerator is specifically used for accomplishing some specific processing tasks, most of the data it requests are streaming data. In some scenarios, data requested by a processor core can also constitute streaming data. If it is judged that data requested by a processor core also constitutes streaming data, then handshake save policy can be applied to the processor core so that data requested by the processor core can also be transmitted continuously without having to repeatedly perform handshakes. The judgment about streaming data will be described in detail hereinafter.

In a fourth example, processing unit A sends a data request for streaming data on the bus, and the requested data is in memory, so the memory sends a reply that there is data hit and continuously transmits the hit data it possesses on the bus.

Figure 1B:
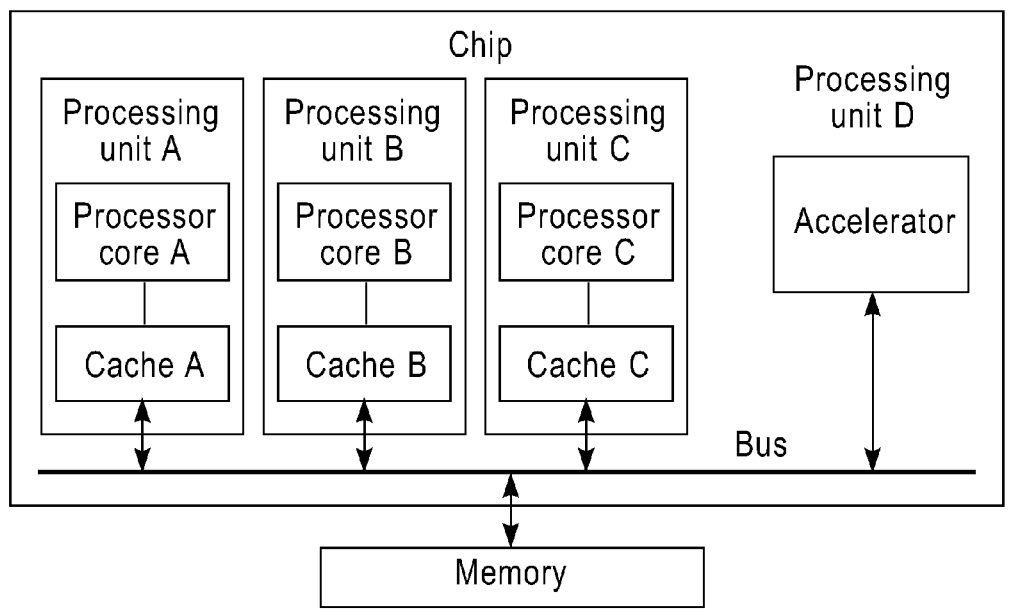
FIG. 1B illustrates a structure diagram of a chip employing an accelerator and multiple processor cores.

FIG. 1B illustrates a structure diagram of a chip employing an accelerator and multiple processor cores. It differs from FIG. 1A that, FIG. 1B includes a plurality of processing units containing processor core, namely, processing units A, B and C. The processing units A, B and C respectively include a processor core and a corresponding cache. Similarly, the cache can either be a first level cache, or can include multilevel caches. The processing unit D is an accelerator. All processing units can send data request on the bus. When an accelerator sends a data request, the requested data can be in cache A, cache B, cache C or memory, and when processing unit A sends a data request, the requested data can be in cache B, cache C or memory. The process of requesting, replying and transmitting streaming data in FIG. 1B is generally similar to that in FIG. 1A, the description of which will be omitted here for brevity.

Although only one accelerator is depicted in FIG. 1B, the invention is not limited to only install one accelerator in a chip. The handshake save policy is also applicable in case a chip includes more than one accelerator.

Figure 3:
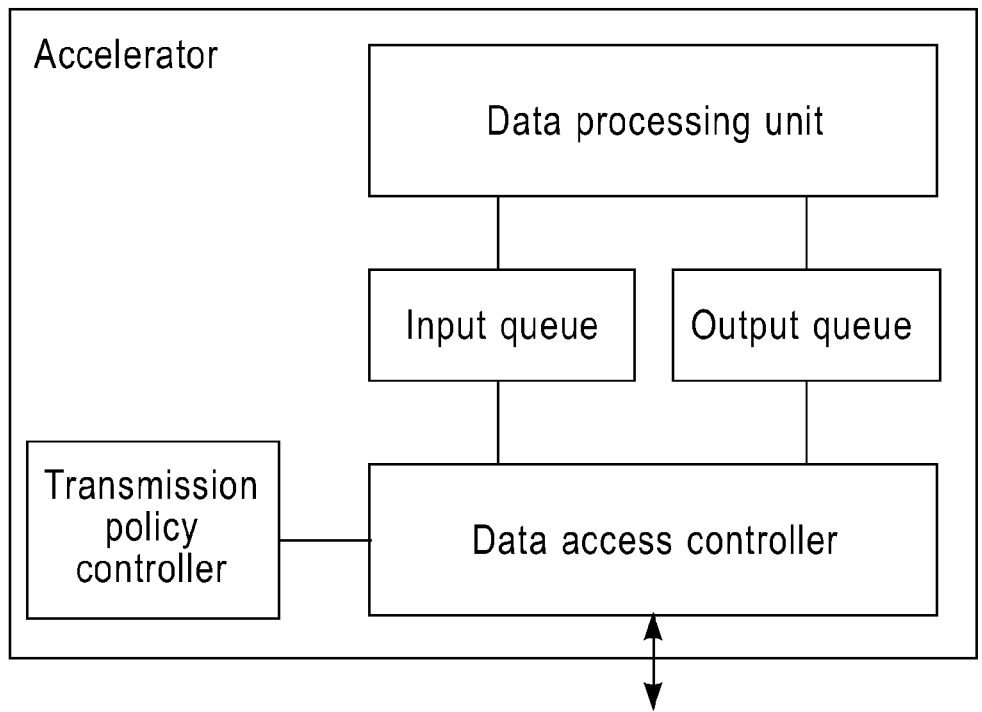
FIG. 3 illustrates a structure diagram of an accelerator according to an embodiment of the invention.

FIG. 3 illustrates a structure diagram of an accelerator according to an embodiment of the invention. The accelerator includes a data processing unit, an input queue, an output queue, a data access controller and a transmission policy controller. The data processing unit is used to accomplish specific data processing tasks. The input queue is used to queue data inputted into the accelerator, and the output queue is used to queue data outputted from the accelerator. The data access controller is used to send data request on the bus, receive reply to the data request from the bus if there is hit data block, and receive the requested data block from the bus if there is hit data block. The data access controller can be one piece of hardware logic or a combination of multiple pieces of hardware logic, each piece of hardware logic accomplishes one or more functions, e.g. the data access controller can be divided into three pieces of hardware logic, which are used to accomplish functions of sending data request, receiving reply and receiving data, respectively.

The transmission policy controller is used to control initiation of a handshake save policy according to predetermined applicable condition. The handshake save policy is used to allow data blocks of at least two adjacent address segments to be continuously transmitted on a bus. If the transmission policy controller enables a handshake save policy, a handshake save command will be set as valid in data request sent by the accelerator, thereby requiring the returned data to be transmitted according to the handshake save policy.

FIG. 6A illustrates a structure diagram of a data request signal according to an embodiment of the invention. The data request includes a read/write identification, a handshake save command, a request ID, a processing unit ID, a start address and an end address. The read/write identification is used to identify read/write command of data. For example, number "0" indicates that the accelerator wishes to read data from other storage unit. The handshake save command is used to identify whether the present data transmission will be performed according to handshake save policy. For example, number "1" indicates that the handshake save policy is in a valid state. The request ID represents identification number of the present data request, for example, the identification number is 0001. The processing unit ID represents identification number of processing unit. Taking FIG. 1B for example, identification number of processing unit A is 1000, identification number of processing unit B is 0100, identification number of processing unit C is 0010, and identification number of processing unit D is 0001, In FIG. 6A, the processing unit ID is 0001, which indicates that the accelerator is requesting data. The start address represents start virtual address of the requested data. The end address represents end virtual address of the requested data. Including start address and end address in a data request enables data in this address range to be continuously transmitted. In the example of FIG. 6A, range of the requested data is 32-543.

Figure 4:
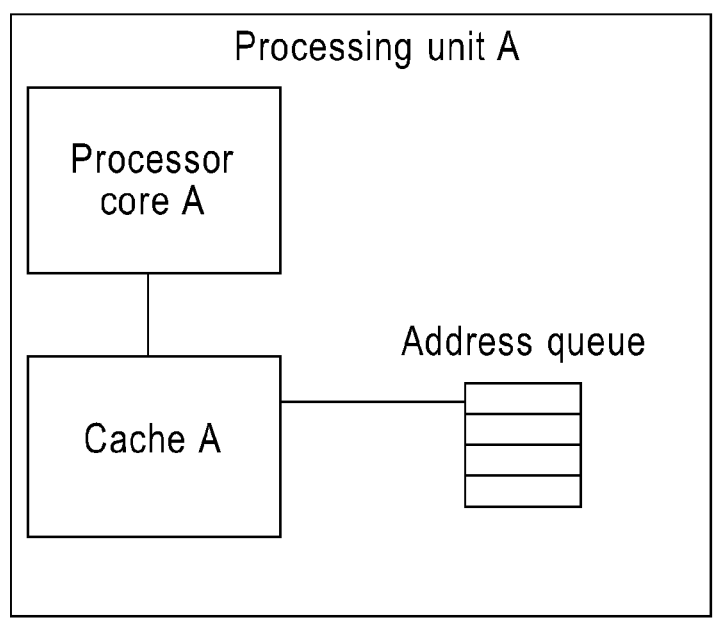
FIG. 4 illustrates a structure diagram of a processing unit containing a processor core according to an embodiment of the invention.

FIG. 4 illustrates a structure diagram of a processing unit containing a processor core according to an embodiment of the invention. Assume that the data requested by the accelerator is stored in cache A of processing unit A. The processing unit A includes an address queue which records start and end address of the data request, i.e. 32 and 543. The processing unit A, after receiving the data request, compares start address 32 with data address of all cachelines stored in cache A to check whether there is data hit. In one embodiment, the start address 32 is matched with address stored in tag of the cache to judge whether there is data hit. In another embodiment, the cache operates in slave memory mode, so data itself in the cache is arranged by address size, thus by judging whether start address 32 falls into range of address stored in the cache, whether there is data hit can be more quickly determined.

As mentioned before, streaming data is characterized in that data blocks have continuous address, and normally the requested data blocks are located in a same cache. For streaming data, if data block at start address is in a cache, then it is likely that subsequent data blocks are also in that cache. Therefore, for the purpose of saving computing resource, there is no need to check how many hit data blocks are stored in the cache, and a reply that there is data hit can be sent as long as the start address is hit. In the following data transmission stage, address matching needs to be performed to continuously transmit the hit data, which will be described in detail hereinafter. In other embodiment, the number of hit data blocks in cache can be further calculated, but the cost is more computing resource will be consumed to perform address matching.

The data blocks of data requested by an accelerator can be stored in a non-local cache or be stored in memory. In both cases, a data hit can be determined via address matching, and hit data blocks will be transmitted according to the handshake save policy if there is hit data block.

FIG. 6B illustrates a structure diagram of a reply signal according to an embodiment of the invention. The reply includes a read/write identification, a handshake save policy response identification, a request ID, a storage unit ID, and a hit-or-not identification. The read/write identification is consistent with the one in the data request. The handshake save policy response identification is used to indicate that it agrees to transmit hit data block according to the handshake save policy if there is any hit data block. For example, number "1" represents that it is agreed to transmit hit data blocks according to handshake save policy. The request ID is consistent with the one in the data request. The storage unit ID represents identification number of storage unit, taking FIG. 1B for example, identification number of cache A is 1000, identification number of cache B is 0100, identification number of cache C is 0010, and identification number of memory is 0000. In FIG. 6A, the storage unit ID is 1000, which indicates that there are hit data blocks stored in cache A of processing unit A. The hit-or-not identification is used to indicate whether there is any data hit. In FIG. 6B, the hit-or-not identification is 1, which indicates that there is data hit in cache A. After performing address matching according to start address 32, other storage units find that there is no hit data and will send a reply that there is no hit. The hit-or-not identification in the reply is 0.

Cache A will continuously transmit the hit data it possesses to the accelerator. Returning to FIG. 4, since address queue in the processing unit A records the start and end address in the data request, the processing unit can continuously match address falling between the start and end address with address stored in cache A during data transmission to determine hit data blocks and transmit them on the bus. For example, assume a cacheline stores 32 byte data and cache A stores data blocks whose address are 32-351 and 480-543.

According to one embodiment of the invention, the processing unit A first queries whether data block whose address is 32 is hit or not. If yes, data block will be transmitted. Meanwhile, the processing unit A queries whether the data block whose address is 64 is hit or not. If yes, the data block will be transmitted. This process is repeated until it reaches a data block whose address is 352 and finds that there is no hit data block. so the processing unit A will stop querying. The accelerator needs to again send a data request for data after address 352. Thus, the accelerator can receive the requested data blocks in order of address without having to perform ordering again.

According to another embodiment of the invention, the processing unit A, after querying that data at address 352 does not have hit data block, continues to query whether data at address 384, 416 and the like are hit or not. It will continue until it finds data at address 480 has data block hit, and then will transmit corresponding data blocks. Thus, the accelerator obtains all the data at address 32-351 and 480-543 via the first data request. For data between address 352-479, the accelerator needs to send a data request again. Therefore, all the data within address range 32-543 that are received by the accelerator are not arranged in order of address. A new logic shall be added into the accelerator for performing ordering process on all the data received.

After the hit data blocks (e.g. all the data blocks containing address 32-543) possessed by the cache A have been continuously transmitted, cache A will send a transmission complete signal to accelerator to indicate that all the hit data blocks have been transmitted according to the handshake save policy. FIG. 6C illustrates a structure diagram of a transmission complete signal according to an embodiment of the invention. The transmission complete signal includes a request ID and a completion mark. The request ID is consistent with the request ID in the data request and reply. The completion mark indicates that all the hit data in storage unit 1000 have been continuously transmitted. This does not necessarily mean that storage unit 1000 hits the requested data in all the data requests, in other words, the requested data in some data requests can not stored in storage unit 1000, but stored in other storage unit. Such an embodiment is described in FIGS. 7A-7F.

FIG. 7A illustrates a structure diagram of a data request signal according to another embodiment of the invention. The data structure of the data request in FIG. 7A is the same as that in FIG. 6A. In the example shown in FIG. 7A, the accelerator sends a data request on the bus with a request ID of 0010, requests all the data within virtual address range of 15648-16415, and requires that the data are transmitted according to a handshake save policy.

FIG. 7B illustrates a structure diagram of a reply signal according to another embodiment of the invention. The data structure of the reply in FIG. 7B is the same as that in FIG. 6B. FIG. 7B indicates that cache A whose storage unit ID is 1000 possesses hit data blocks, and agrees to transmit the blocks according to the handshake save policy. In this example, the hit-or-not identification is 1, which indicates that there is data hit, but does not provide specific information such as how many data blocks are hit and whether all the requested data are hit or not. In this example, cache A merely hits data at address 15648-16383, that is a part of the data is not hit.

FIG. 7C illustrates a structure diagram of a transmission complete signal according to another embodiment of the invention. The transmission complete signal indicates that all the hit data possessed by cache A have been transmitted.

After the accelerator receives all the data hit by cache A, it finds that it has not obtained data segment 16384-16415 it requests and will send a data request again. FIG. 7D illustrates a structure diagram of a data request signal according to yet another embodiment of the invention. In the data request of FIG. 7D, the accelerator again requests data within address range of 16834-16415.

FIG. 7E illustrates a structure diagram of a reply signal according to yet another embodiment of the invention. The reply in FIG. 7E represents that a storage unit whose storage unit ID is 0100, i.e. cache B, possesses data within address range 16834-16415 again requested by accelerator, and cache B agrees to continuously transmit the hit data according to a handshake save policy. Other storage unit finds there is no data hit after performing address matching according to start address 16384, and will send a reply that there is not any hit, namely, the hit-or-not identification in the reply is 0.

FIG. 7F illustrates a structure diagram of a transmission complete signal according to yet another embodiment of the invention. The signal in FIG. 7F indicates that all the hit data in cache B have been transmitted.

Returning to FIG. 3, the transmission policy controller in FIG. 3 is used to control initiation of a handshake save policy according to predetermined applicable condition, wherein the predetermined applicable condition can be set by programmer through programming. Further, the predetermined applicable condition includes one of the following conditions: (i) enable a handshake save policy, until all the hit data blocks in one storage unit have been transmitted according to the handshake save policy; (ii) enable a handshake save policy, only permit a predetermined number of data blocks of adjacent address segments to be continuously transmitted; (iii) enable a handshake save policy based on busy status of the bus; and (iv) enable a handshake save policy, until a program disables the handshake save policy.

Enabling a handshake save policy until all the hit data blocks in one storage unit have been transmitted according to the handshake save policy refers to the following: If there are two or more storage units that each contain the requested data, then stop applying the handshake save policy after the first storage unit has returned its hit data. According to the examples in FIGS. 7A-7F, after cache A whose storage ID is 1000 has returned the hit data blocks (15648-16383) it possesses, the accelerator again sends a data request. When the accelerator does this, the application of the handshake save policy is stopped and the handshake save command in the data request is set as 0. Thus, an overlong data request of a processing unit will not lead to an overlong occupancy of a bus resource.

The purpose of enabling a handshake save policy and only permit a predetermined number of data blocks of adjacent address segments to be continuously transmitted is to limit the size of data blocks transmitted according to the handshake save policy. For example, the handshake save policy is only allowed to be applied to data request in which the difference between end address and start addresses is within a certain range (e.g. within 512 bits). This is also to avoid occupying too much bus resource due to transmit too many data blocks at one time, thereby affecting operation of other processing units.

Enabling a handshake save policy based on a busy status of the bus refers to enabling the handshake save policy when the bus is not busy, and to disable the handshake save policy when the bus is busy. Whether a bus is busy or not can be freely set by a programmer as needed.

Enabling a handshake save policy until a program disables the handshake save policy refers to permitting the handshake save command in the data request to be set as 1, until a programmer applies control through programming and sets the handshake save command as invalid. If data are always allowed to be transmitted according to the handshake save policy, data congestion will probably occur on the bus due to transfer a large amount of data. Therefore, programmer shall be allowed to control the application of handshake save policy.

In the examples of FIGS. 6A-6C and 7A-7F, the accelerator sends a data request as a processing unit, and the requested data are transmitted according to handshake save policy. However, in the present invention, in addition to the accelerator, a processor core in the processing unit can also request streaming data, thus handshake save policy can also be applied. The processor core shall further include a streaming data judging means for judging whether the requested data is streaming data through address of the requested data and for forming data request for streaming data if the requested data is streaming data.

Figure 5:
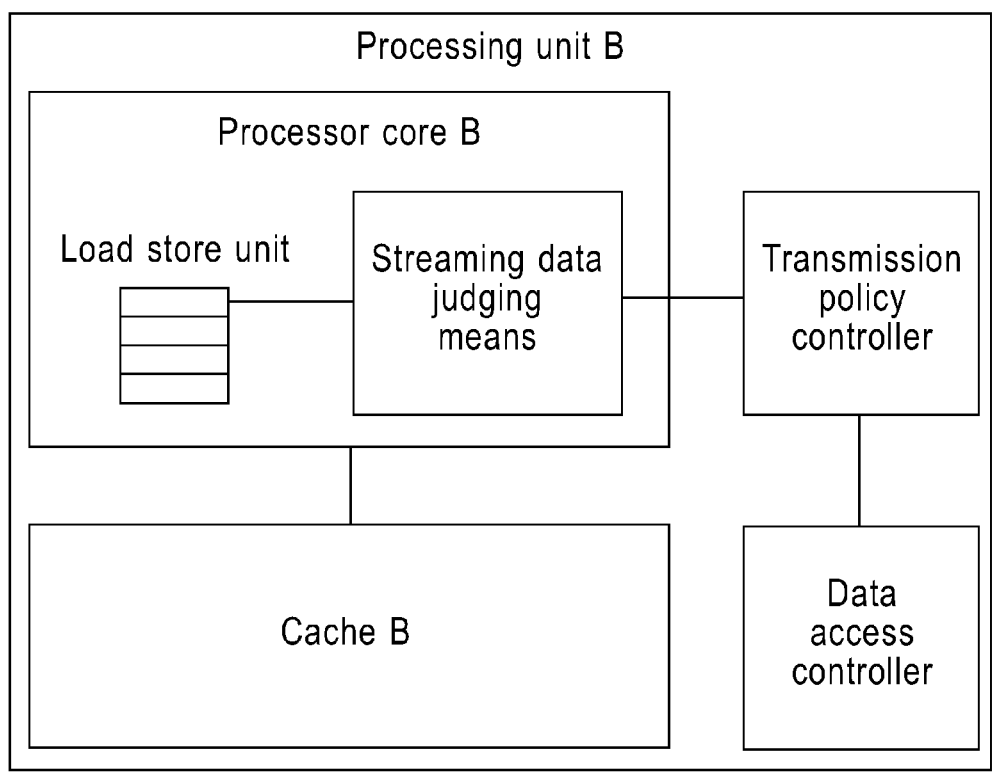
FIG. 5 illustrates a structure diagram of a processing unit containing a processor core according to another embodiment of the invention.

FIG. 5 illustrates a structure diagram of a processing unit containing a processor core according to another embodiment of the invention. FIG. 5 depicts the structure diagram of processing unit B, which is similar to the structure of other processing unit containing processor core. The processing unit B includes a processor core B, a cache B, a transmission policy controller and a data access controller. The cache B represents memory bank of the cache. The function of the transmission policy controller and data access controller in FIG. 5 is similar to that of the transmission policy controller and data access controller in the accelerator of FIG. 3 and details thereof will be omitted here for brevity. It differs from the accelerator in that, a load store unit (LSU) and a streaming data judging means are added into the processor core B. The LSU records address of data requested by processor core B, and the streaming data judging means judges whether the data requested by processor core B are streaming data based on whether addresses recorded by the LSU are continuous. If data requested by processor core B are streaming data, processing unit B will then determine through the transmission policy controller whether the data request sent by processor core B requests data to be transmitted according to handshake save policy. The formats of data request, reply and transmission complete signal are similar to those depicted in FIGS. 6A-6C and 7A-7F. The data blocks of the streaming data requested by processor core B can be stored in other non-local caches (such as caches A and C) or in memory.

Figure 8:
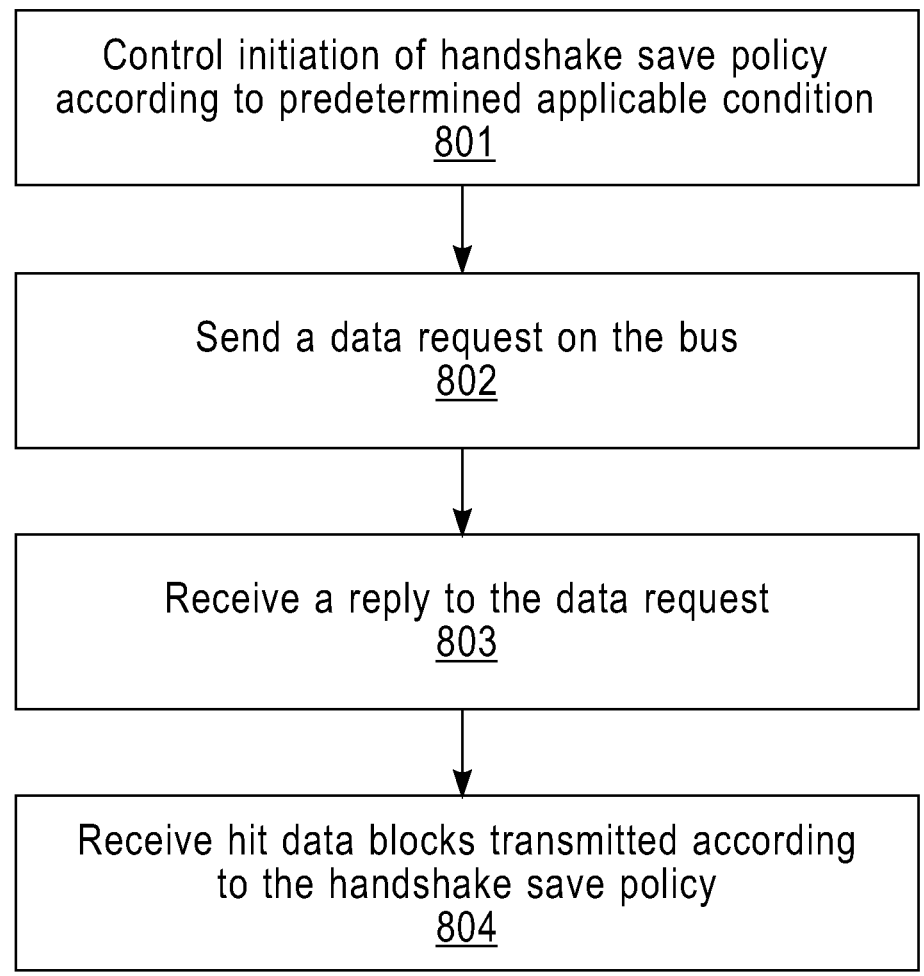
FIG. 8 illustrates a flow chart of a method for performing data transmission according to a handshake save policy.

Respective specific steps of the method for performing data transmission according to handshake save policy have been described above in some extent. This transmission process will be wholly described and those specific steps that have been described above will not be repeated. FIG. 8 illustrates a flow chart of a method for performing data transmission according to handshake save policy. At step 801, initiation of handshake save policy is controlled according to a predetermined applicable condition, the handshake save policy being used to allow data blocks of at least two adjacent address segments to be continuously transmitted on a bus. At step 802, a data request is sent on the bus. At step 803, a reply to the data request is received from the bus. At step 804, hit data blocks transmitted according to the handshake save policy are received from the bus if there are any hit data blocks.

As will be appreciated by one skilled in the art, the present invention can be embodied as a system, method or computer program product. Accordingly, the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, the present invention can take the form of a computer program product embodied in any tangible medium of expression having computer usable program code embodied in the medium.

Any combination of one or more computer usable or computer readable medium(s) can be utilized. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium can even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to wireless, wireline, optical fiber cable, RF, etc.

Computer program code for carrying out operations of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A processing unit for accelerating data transmission from a data store, the processing unit being coupled to a bus, and the processing unit comprising:
    a transmission policy controller configured to initiate a handshake save policy according to a predetermined condition, the handshake save policy allowing data blocks of at least two adjacent address segments in the data store to be continuously transmitted on the bus from the data store; and
    a data access controller configured to send a data request on the bus to the data store, wherein
    the data request includes a handshake save command and specifies an address range;
    the data store receives the data request, determines if adjacent data blocks are stored in the specified address range; and if adjacent data blocks are stored in the specified address range, transmits a reply to the data access controller and transmits the adjacent data blocks to the data access controller using the handshake save policy; and
    the data access controller is further configured to receive said reply and said adjacent data blocks from the data store.

2. The processing unit according to claim 1, wherein the processing unit is an accelerator.

3. The processing unit according to claim 1, further comprising: a processor core; and a cache, wherein the processor core comprises a streaming data judging means configured to judge whether the requested data is streaming data through an address of the requested data and to form the data request for streaming data if the requested data is streaming data.

4. The processing unit according to claim 2, wherein: the handshake save command is configured to indicate whether the adjacent data blocks stored in the specified address range will be transmitted according to the handshake save policy; and the data request comprises a start address and an end address of the requested data.

5. The processing unit according to claim 3, wherein: the handshake save command is configured to indicate whether the adjacent data blocks stored in the specified address range will be transmitted according to the handshake save policy; and the data request comprises a start address and an end address of the requested data.

6. The processing unit according to claim 2, wherein the reply comprises a handshake save policy response identification to indicate an agreement to transmit the data blocks stored in the specified address range according to the handshake save policy.

7. The processing unit according to claim 3, wherein the reply comprises a handshake save policy response identification to indicate an agreement to transmit the adjacent data blocks stored in the specified address range according to the handshake save policy.

8. The processing unit according to claim 2, wherein the data access controller is further configured to receive a transmission complete signal to indicate that all the adjacent data blocks stored in the specified address range have been transmitted according to the handshake save policy.

9. The processing unit according to claim 3, wherein the data access controller is further configured to receive a transmission complete signal to indicate that all the adjacent data blocks stored in the specified address range have been transmitted according to the handshake save policy.

10. The processing unit according to claim 2, wherein the predetermined applicable condition can be set via programming.

11. The processing unit according to claim 3, wherein the predetermined applicable condition can be set via programming.

12. The processing unit according to claim 2, wherein the predetermined condition comprises one of the following conditions: the handshake save policy is enabled until all the adjacent data blocks stored in the specified address range in one storage unit have been transmitted according to the handshake save policy; the handshake save policy only permits a predetermined number of data blocks of adjacent address segments to be continuously transmitted; the handshake save policy is based on a busy status of the bus; the handshake save policy is enabled until a program disables the handshake save policy.

13. The processing unit according to claim 3, wherein the predetermined condition comprises one of the following conditions: the handshake save policy is enabled until all the adjacent data blocks stored in the specified address range in one storage unit have been transmitted according to the handshake save policy; the handshake save policy only permits a predetermined number of data blocks of adjacent address segments to be continuously transmitted; the handshake save policy is based on a busy status of the bus; the handshake save policy is enabled until a program disables the handshake save policy.

14. The processing unit according to claim 2, wherein data blocks of the requested data are stored in a non-local cache, and address matching is used to determine if there are any adjacent data blocks stored in the specified address range in the non-local cache.

15. The processing unit according to claim 3, wherein data blocks of the requested data are stored in a non-local cache, and address matching is used to determine if there are any adjacent data blocks stored in the specified address range in the non-local cache.

16. The processing unit according to claim 2, wherein data blocks of the requested data are stored in memory, and address matching is used to determine if there are any adjacent data blocks stored in the specified address range in the memory.

17. The processing unit according to claim 3, wherein data blocks of the requested data are stored in memory, and address matching is used to determine if there are any adjacent data blocks stored in the specified address range in the memory.

18. A chip for accelerating data transmission, comprising: the processing unit according to claim 1; a bus; and a memory.

19. A method for accelerating data transmission from a data store, comprising:
   initiating a handshake save policy according to a predetermined applicable condition, the handshake save policy allowing data blocks of at least two adjacent address segments in the data store to be continuously transmitted on a bus from the data store;
   sending a data request on the bus from a data access controller to the data store;
   wherein the date request includes a handshake save command and specifies an address range; the data store receives the data request, determines if adjacent data blocks are stored in the specified address range; and if adjacent data blocks are stored in the specified address range, transmits a reply to the data access controller and transmits the adjacent data blocks to the data access controller using the handshake save policy; and the data access controller receives said reply and said adjacent data blocks from the data store.

20. The method according to claim 19, further comprising: judging whether the requested data is streaming data through an address of the requested data, and forming the data request for streaming data if the requested data is streaming data.

21. The method according to claim 19, wherein the handshake save command indicates whether the adjacent data blocks stored in the specified address range will be transmitted according to the handshake save policy; and the data request comprises a start address and an end address of the requested data.

22. The method according to claim 19, wherein the reply comprises a handshake save policy response identification to indicate an agreement to transmit the adjacent data blocks stored in the specified address range according to the handshake save policy.

23. The method according to claim 19, further comprising: receiving a transmission complete signal to indicate that all the adjacent data blocks stored in the specified address range have been transmitted according to the handshake save policy.

24. The method according to claim 19, wherein the predetermined condition can be set via programming.

25. The method according to claim 19, wherein the predetermined condition comprises one of the following conditions: the handshake save policy is enabled until all the adjacent data blocks stored in the specified address range
   in one storage unit have been transmitted according to the handshake save policy; the handshake save policy only permits a predetermined number of data blocks of adjacent address segments to be continuously transmitted; the handshake save policy is based on a busy status of the bus; the handshake save policy is enabled until a program disables the handshake save policy.

\* \* \* \* \*